R. Spear,
Hose Coupling.
No. 103,252. Patented May 17, 1870.

Witnesses
John A. Ellis
Henry N. Miller

Inventor
Robert Spear,
Per
T. H. Alexander
Atty.

United States Patent Office.

ROBERT SPEAR, OF NEW HAVEN, CONNECTICUT.

Letters Patent No. 103,252, dated May 17, 1870.

IMPROVEMENT IN PIPES FOR TRANSMITTING PNEUMATIC CURRENTS FOR MOTIVE POWER.

The Schedule referred to in these Letters Patent and making part of the same.

*To all whom it may concern:*

Be it known that I, ROBERT SPEAR, of New Haven, in the county of New Haven and State of Connecticut, have invented certain new and useful Improvement in Devices for Transmitting Power; and I do hereby declare that the following is a full, clear, and exact description thereof, reference being had to the accompanying drawings and to the letters of reference marked thereon, which form a part of this specification.

My present invention is an improvement upon the "mode of transmitting power," for which Letters Patent were granted to me October 5, 1869, and consists in certain devices whereby I am enabled to regulate the power by means of adjustable contractors, and also make provision for turning the conduit at different angles without lessening its force.

In order to enable others skilled in the art to which my invention appertains to make and use the same, I will now proceed to describe its construction and operation, referring to the annexed drawings, in which—

Figure 1:
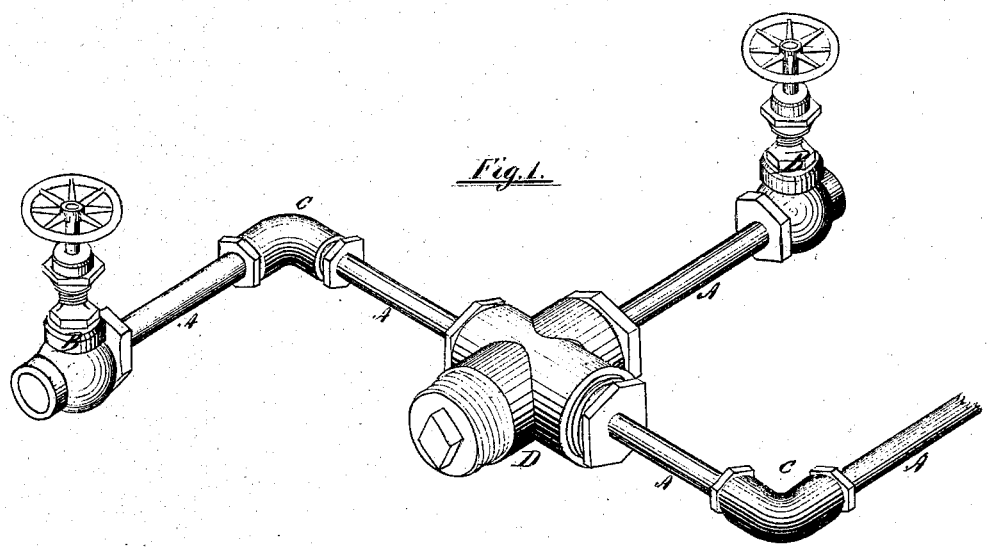
Figure 2:
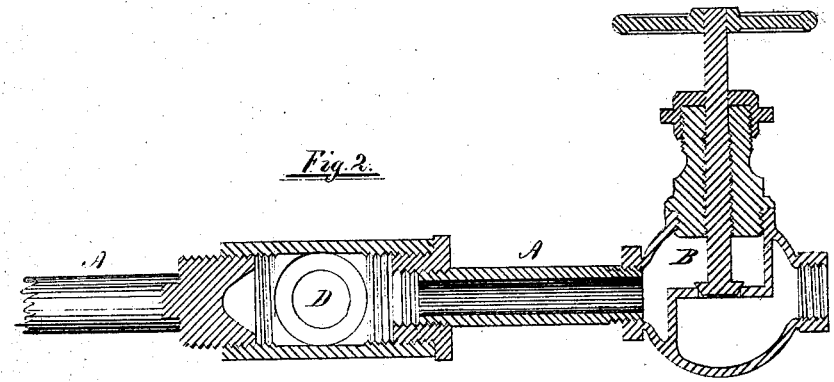

Figure 1 is a perspective view; and
Figure 2 a longitudinal vertical section.

In my patent above referred to I had tubes or pipes acting as reservoirs, and said tubes connected by tubes of smaller diameter, whereby it is possible to transmit power with unabated force any distance desired.

In the present case A A represent said tubes, or reservoirs, acting as a conduit for the fluid or air, but in place of the smaller connecting-tubes I employ globe-valves or stop-cocks, B B, which, in the first instance, are to be set or contracted, so as to diminish the passage for the fluid or air in just such a proportion that the force or fluid will be transmitted with undiminished density.

This is readily determined by the use of test-gauges, and the stop-cocks being turned until the gauges show the same amount of force as is applied at the power-source. If, for instance, sixty pounds of pressure is applied, and the openings contracted by means of the stop-cocks to transmit this amount of force, then if it be desired to transmit only half that amount, with the same density of the fluid or air used, it will only be necessary to still further contract said passages by means of the valves or stop-cocks until the gauges along the entire line show just that amount of pressure.

By means of these adjustable contractors I am thus enabled to regulate the force transmitted in the exact proportion as I want to apply the same.

In laying a conduit of considerable length it will almost invariably be necessary to change the direction of the conduit, that is to turn corners or form angles, and if the conduit at such points were of the same size there would be a considerable loss of power.

This difficulty is obviated by using elbows, C C, and crosses, D, of a diameter not less than twice that of the conduit itself. If these elbows are square their diameter must be larger, but if curved I have found, by experiments, that, although they may be as large as convenient, they should not be less than the dimensions given above, and, if so made, there will be no perceptible loss of power, as they will act as reservoirs upon which the force is exerted at one end, as fully explained in my former patent.

I do not intend to confine myself to the use of globe-valves or stop-cocks for contracting the openings or joints in the tubes, as I may employ any means by which said openings can be contracted from the outside at will, and such adjustable contractors should be placed at uniform distances apart for obvious reasons. Neither do I confine myself to the forms of the enlargements at the bends or crosses of the conduit, as it is obvious the desired effect can be accomplished by any sufficient augmentation, regardless of their shape.

Having thus fully described my invention,

What I claim as new and desire to secure by Letters Patent, is—

Tubes for the transmission of power, connected at the points where the direction of such tubes is changed by means of tubes or other other suitable connections, of a larger diameter or size than the conduit itself, substantially as and for the purposes herein set forth.

In testimony that I claim the foregoing as my own, I affix my signature in presence of two witnesses.

ROBERT SPEAR.

Witnesses:
T. H. ALEXANDER,
JOSEE JOHNSON.